(12) United States Patent
Frank

(10) Patent No.: US 8,579,056 B1
(45) Date of Patent: Nov. 12, 2013

(54) SPIRAL DRIVE AND TRANSPORT DEVICE USING THE SAME

(71) Applicant: Lowell C. Frank, Okauchee, WI (US)

(72) Inventor: Lowell C. Frank, Okauchee, WI (US)

( * ) Notice: Subject to any disclaimer, the term of this patent is extended or adjusted under 35 U.S.C. 154(b) by 0 days.

(21) Appl. No.: 13/804,809

(22) Filed: Mar. 14, 2013

Related U.S. Application Data

(60) Provisional application No. 61/613,082, filed on Mar. 20, 2012.

(51) Int. Cl.
B62D 57/00 (2006.01)

(52) U.S. Cl.
USPC .............. 180/7.2; 180/7.1; 180/20; 301/5.23; 440/12.65; 440/48

(58) Field of Classification Search
USPC ............. 180/7.2, 20; 301/5.23; 440/12.65, 48
See application file for complete search history.

(56) References Cited

U.S. PATENT DOCUMENTS

| | | | | |
|---|---|---|---|---|
| 344,621 A * | 6/1886 | Catlin | ............................. | 440/99 |
| 847,961 A * | 3/1907 | De La Mar | ............... | 416/200 R |
| 1,254,479 A * | 1/1918 | Chisholm | ...................... | 180/7.2 |
| 2,320,451 A * | 6/1943 | Akins | ............................ | 440/48 |
| 2,706,958 A * | 4/1955 | Cutting et al. | ............. | 440/12.65 |
| 3,420,326 A * | 1/1969 | Kusmer | .......................... | 180/6.2 |
| 3,591,241 A * | 7/1971 | Allen | ................................ | 305/8 |
| 3,746,112 A * | 7/1973 | Ilon | ................................ | 180/6.2 |
| 3,789,947 A * | 2/1974 | Blumrich | ..................... | 180/6.48 |
| 4,198,917 A * | 4/1980 | Oshima et al. | .................. | 114/42 |
| 4,838,819 A * | 6/1989 | Todorovic | ........................ | 440/47 |
| 5,121,699 A * | 6/1992 | Frank | .............................. | 110/246 |
| 5,203,729 A * | 4/1993 | Beller et al. | ..................... | 440/48 |
| 6,547,340 B2 * | 4/2003 | Harris | .......................... | 301/5.23 |
| 6,668,950 B2 * | 12/2003 | Park | ............................... | 180/7.1 |
| 6,966,807 B2 * | 11/2005 | Leonov et al. | .................. | 440/98 |
| 7,255,618 B2 * | 8/2007 | Leonov et al. | .................. | 440/98 |
| 7,621,355 B2 * | 11/2009 | Chu et al. | ......................... | 180/7.2 |
| 7,980,335 B2 * | 7/2011 | Potter | ............................. | 180/7.1 |
| 8,408,339 B2 * | 4/2013 | Makino | .......................... | 180/7.1 |
| 8,430,044 B2 * | 4/2013 | Foo et al. | ......................... | 114/40 |
| 8,496,299 B2 * | 7/2013 | Brudniok | ..................... | 301/5.23 |
| 2009/0044990 A1 * | 2/2009 | Lexen | ............................. | 180/7.2 |

FOREIGN PATENT DOCUMENTS

JP 01186484 A * 7/1989 ............. B62D 57/02

* cited by examiner

Primary Examiner — J. Allen Shriver, II
Assistant Examiner — Conan Duda
(74) Attorney, Agent, or Firm — Donald J. Ersler

(57) ABSTRACT

A transport device includes a support base, at least two spiral drives, at least one drive device, a control device and a power source. Each one of the at least two spiral drives are preferably driven by a single drive device. However, a single drive device could drive the at least two spiral drives through some type of drive system. The at least two spiral drives are rotatably retained on the support base. The at least two spiral drives are rotated through any suitable drive system. The power source supplies power to the at least one drive device through the control device. The control device controls the rotation and the amount of power sent to the at least one drive device. An object to be transported is placed on the support base. However, multiple transport devices may be attached to multiple sides of the object.

9 Claims, 4 Drawing Sheets

SPIRAL DRIVE AND TRANSPORT DEVICE USING THE SAME

CROSS-REFERENCES TO RELATED APPLICATIONS

This is a nonprovisional patent application taking priority from provisional application No. 61/613,082 filed on Mar. 20, 2012.

BACKGROUND OF THE INVENTION

1. Field of the Invention

The present invention relates generally to drive devices and more specifically to a spiral drive and transport device using the same, which may be used to transport or position an object over dry terrain or through a liquid.

2. Discussion of the Prior Art

U.S. Pat. No. 6,966,807 to Leonov et al. discloses a screw drive vehicle. U.S. Pat. No. 7,621,355 to Chu et al. discloses a omniwheel and vehicle using the same. U.S. Pat. No. 7,980,335 to Potter discloses a omni-directional wheel.

Accordingly, there is a clearly felt need in the art for a spiral drive and transport device using the same, which may be used to transport or position an object over smooth surfaces; rough, uneven or lose terrain; on top of a liquid or through a liquid and which may be combined together to make a transport device.

SUMMARY OF THE INVENTION

The present invention provides a spiral drive and transport device using the same, which may be used to transport or position an object over dry terrain or through a liquid. The spiral drive preferably includes two end plates, at least two spiral axles and a plurality of wheels. One end of the at least two spiral axles are attached to one of the two end plates. The plurality of wheels are rotatably retained on the at least two spiral axles. The other one of the two end plates is secured to the other end of the at least two spiral axles.

A transport device includes a support base, at least two of the spiral drives, at least one drive device, a control device and a power source. Each one of the at least two spiral drives are preferably driven by a single drive device. However, a single drive device could drive the at least two spiral drives through some type of drive system. The at least two spiral drives are rotatably mounted to the support base. Each spiral drive may be driven directly by the drive device; through a chain and sprocket arrangement; or through a drive system, such as a transmission. The power source supplies power to the at least one drive device through the control device. The control device controls the rotation and the amount of power sent to the at least one drive device. The power source is preferably electrical power, but could be hydraulic, pneumatic, internal combustion or any other suitable power source. An object to be transported is placed on the support base. However, multiple transport devices may be attached to multiple sides of the object.

Accordingly, it is an object of the present invention to provide a spiral drive, which is used to transport or position an object over smooth surfaces; rough, uneven or lose terrain; on top of a liquid; or through a liquid and which may be combined together to make a transport device.

Finally, it is another object of the present invention to provide a spiral drive, which combines a plurality of spiral devices to create a transport device.

These and additional objects, advantages, features and benefits of the present invention will become apparent from the following specification.

DETAILED DESCRIPTION OF THE PREFERRED EMBODIMENTS

Figure 1:
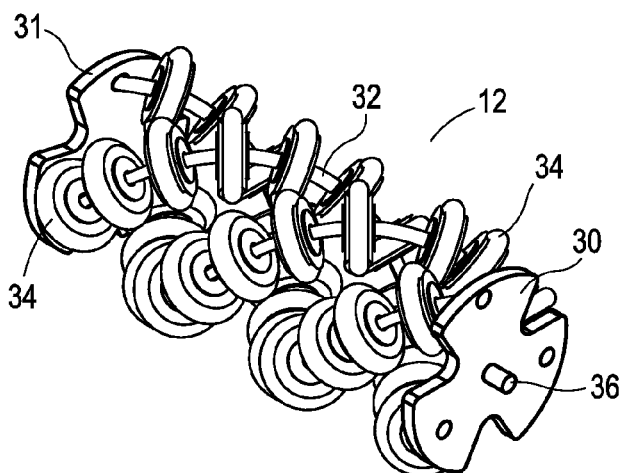
FIG. 1 is a perspective view of a left hand spiral drive in accordance with the present invention.
Figure 2:
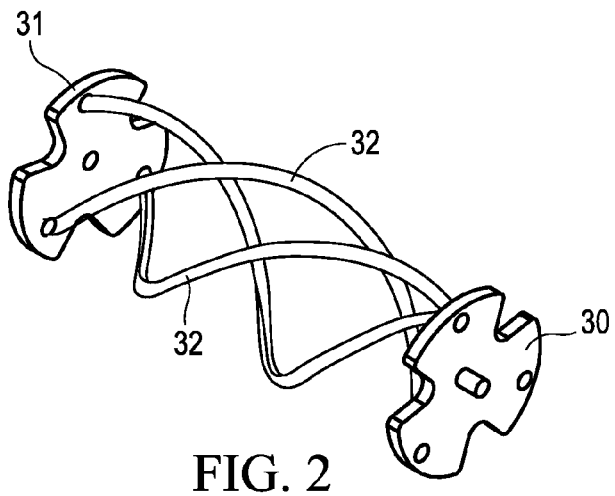
FIG. 2 is a perspective view of a left hand spiral drive with a plurality of wheels removed therefrom in accordance with the present invention.
Figure 3:
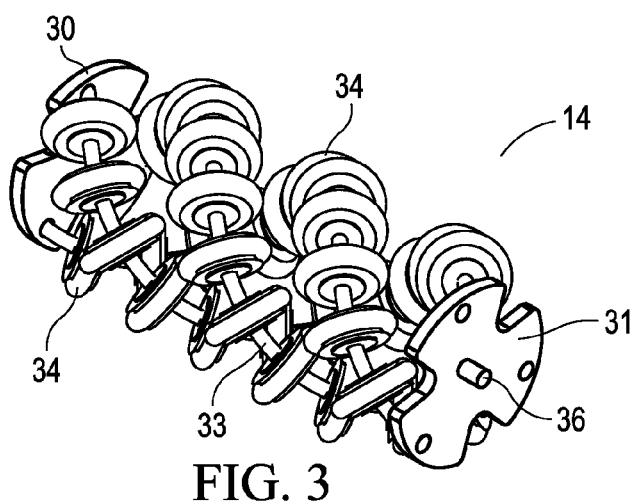
FIG. 3 is a perspective view of a right hand spiral drive in accordance with the present invention.
Figure 4:
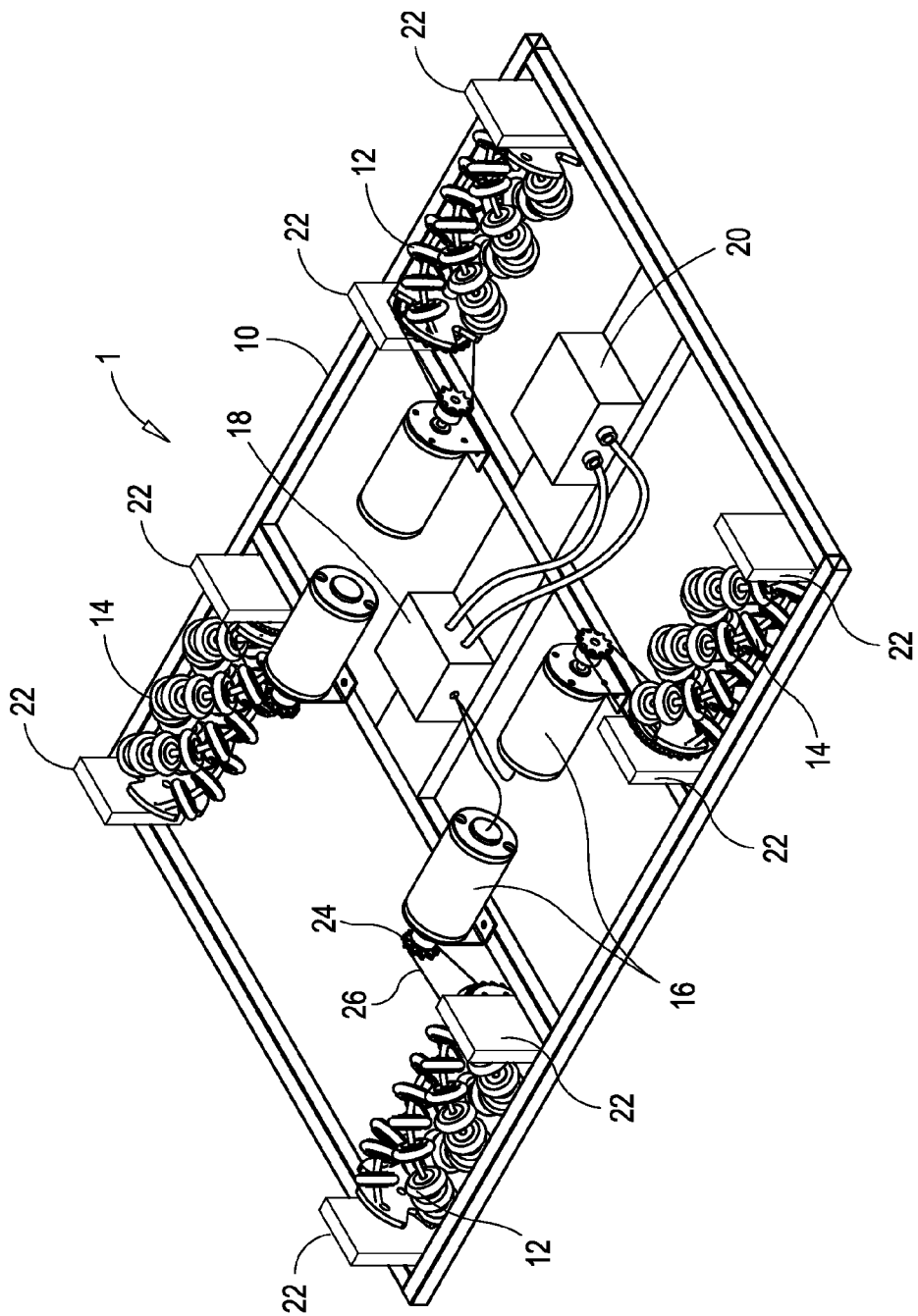
FIG. 4 is a perspective view of a transport device with two left hand spiral drives and two right hand spiral drives in accordance with the present invention.
Figure 5:
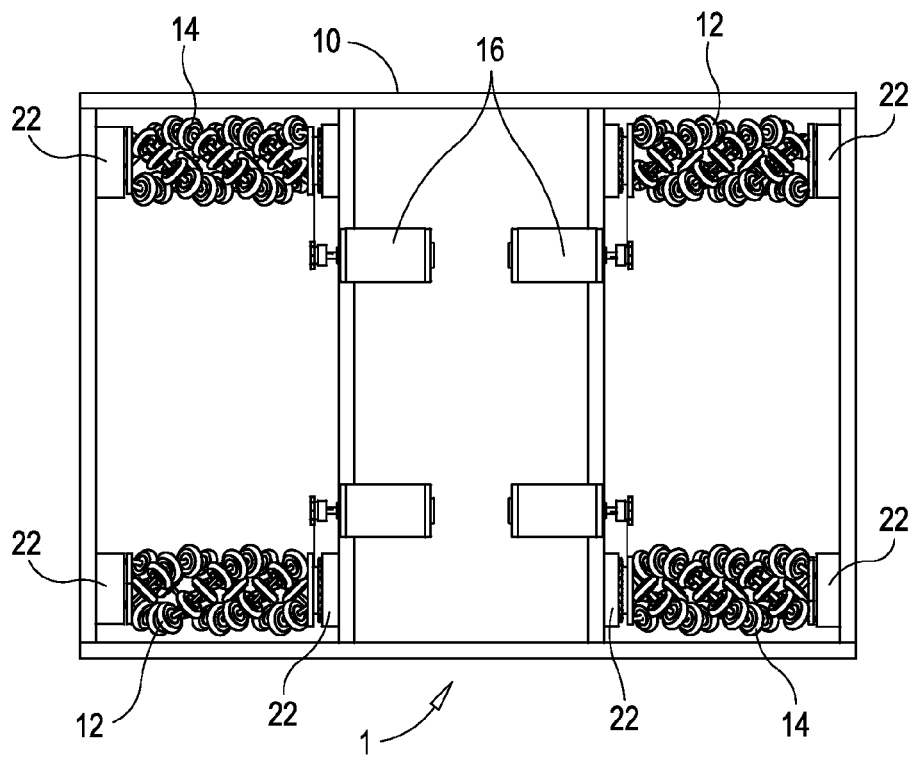
FIG. 5 is a top view of a transport device with two left hand spiral drives and two right hand spiral drives in accordance with the present invention.
Figure 6:
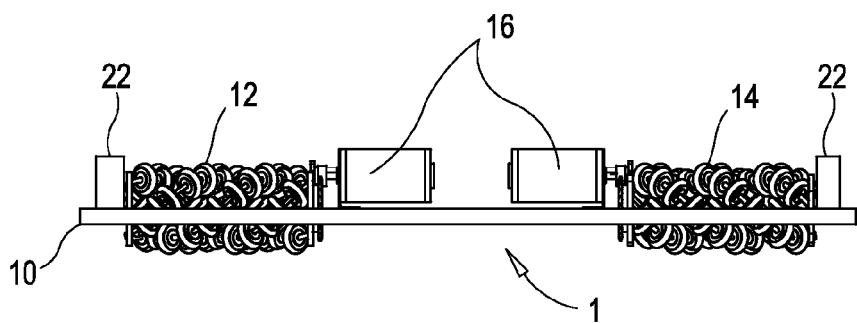
FIG. 6 is an end view of a transport device with two left hand spiral drives and two right hand spiral drives in accordance with the present invention.

With reference now to the drawings, and particularly to FIG. 4, there is shown a perspective view of a transport device 1. With reference to FIGS. 1-3, the transport device 1 preferably includes a support base 10, at least one left hand spiral drive 12, at least one right hand spiral drive 14, at least one drive device 16, a control device 18 and a power source 20. The support base 10 may float on a liquid, by fabricating a portion of the support base 10 from a flotation material. Each spiral drive 12, 14 is preferably driven by a single drive device 16. However, a single drive device 16 could be used to drive the at least two spiral drives 12, 14 through some type of drive system, such as a transmission. The at least two spiral drives 12, 14 are preferably rotatably retained relative to the support base 10 with a plurality of bearing blocks 22 or the like. The bearing blocks 22 are attached to the support base 10 with fasteners, welding or any other suitable method. Each drive device 16 is attached to the support base 10 with fasteners or any suitable method.

Figure 7:
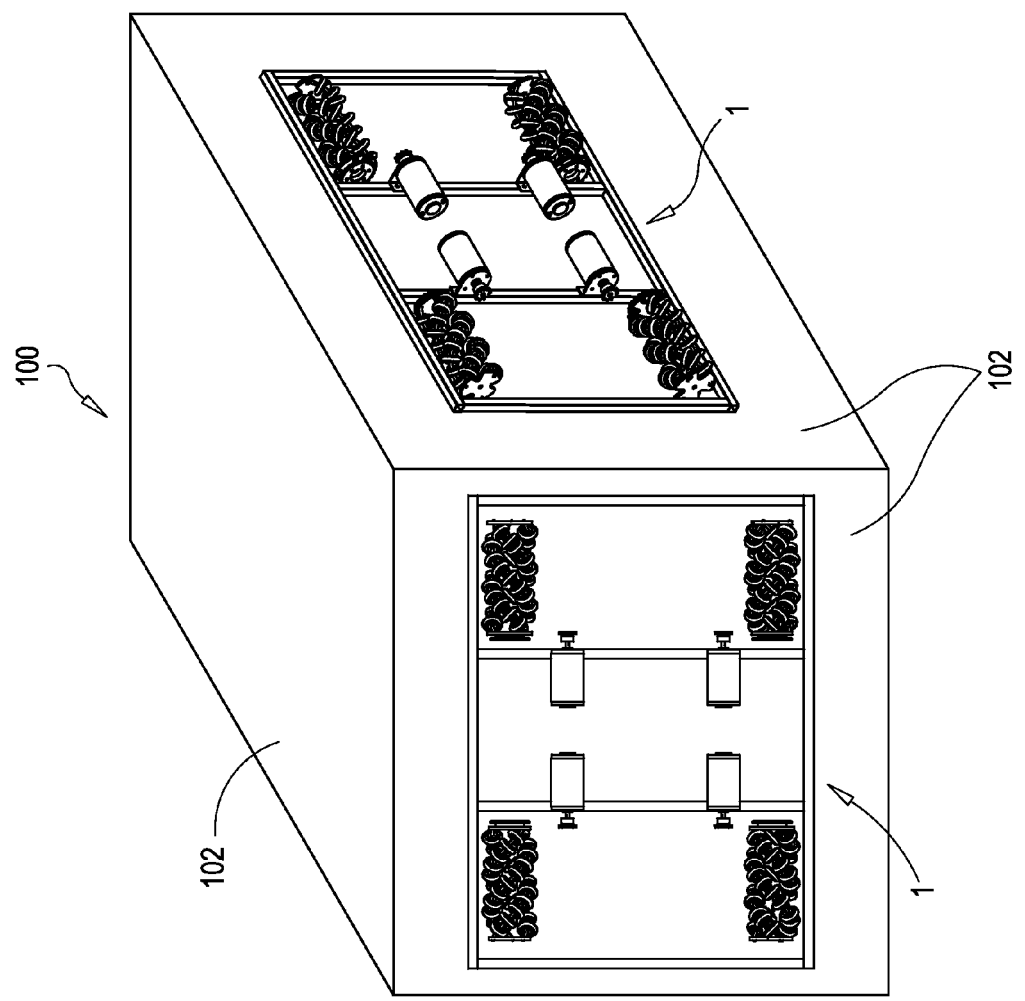
FIG. 7 is an object with two transport devices attached to two sides of an object in accordance with the present invention.

Each spiral drive 12, 14 may be driven directly by the drive device 16; through a chain and sprocket arrangement; or through a drive device. FIG. 4 illustrates a drive gear 24, a chain 26 and a driven gear 28 for driving the spiral drives 12, 14. The power source 20 supplies power to the at least one drive device 16 through the control device 18. The control device 18 controls the rotational direction and the amount of power sent to the at least one drive device 16. The power source 20 is preferably electrical power, but could be hydraulic, pneumatic, internal combustion or any other suitable power source. The power source 20 in FIG. 4 is a battery. An object to be transported or positioned is placed on or attached to the support base 10. With reference to FIG. 7, at least two transport devices 1 are attached to at least two sides 102 of an object 100. If the object 100 is transported over rough, uneven or lose terrain, the object 100 may fall on to a different side 102. If the side 102 has the transport device 1 attached thereto, the object 100 may still be transported.

With reference to FIGS. 1-3, the left hand spiral drive 12 preferably includes two end plates 30, 31, at least two left hand spiral axles 32 and a plurality of wheels 34. Each left hand spiral axle 32 has a left hand twist. Construction of the wheel 34 is dictated by the application for the spiral drive 12, 14. One end of the at least two left hand spiral axles 32 are attached to one of the two end plates 30, 31. The plurality of wheels 34 are rotatably retained on the at least two left hand spiral axles 32. The other one of the two end plates 30, 31 is secured to the other end of the at least two left hand spiral axles 32.

The right hand spiral drive 14 preferably includes two end plates 30, 31, at least two right hand spiral axles 33 and a plurality of wheels 34. Each right hand spiral axle 33 has a right hand twist. One end of the at least two right hand spiral axles 33 are attached to one of the two end plates 30, 31. The plurality of wheels 34 are rotatably retained on the at least two right hand spiral axles 33. The other one of the two end plates 30, 31 is secured to the other end of the at least two right hand spiral axles 33. Each of the two end plates 30, 31 preferably include an axle 36. The axle 36 is rotatably retained in the bearing block 22. The driven gear 28 is attached to one of the two end plates 30, 31 with fasteners or the like.

When the transport device 1 includes a single left hand spiral drive 12 and a single right hand spiral drive 14, forward movement is created by rotating the left hand spiral drive 12 and the right hand spiral drive 14 in a clockwise direction. Reverse movement is created by rotating the left hand spiral drive 12 and the right hand spiral drive 14 in a counter clockwise direction. Rotational movement is created by rotating the left hand spiral drive 12 in the opposite direction as the right hand spiral drive 14.

When the transport device 1 includes at least two left hand spiral drives 12 and at least two right hand spiral drives 14, forward movement is created by rotating all the spiral drives 12, 14 in a clockwise direction. Reverse movement is created by rotating all spiral drives 12, 14 in a counter clockwise direction. Movement to the right is created by rotating the at least two left hand spiral drives 12 in a counter clockwise direction and the at least two right hand spiral drives 14 in a clockwise direction. Movement to the left is created by rotating the at least two left hand spiral drives 12 in a clockwise direction and the at least two right hand spiral drives 14 in a counter clockwise direction. The transport device 1 is rotated by rotating one left hand spiral drive 12 and one right hand spiral drive 14 in a clockwise direction and rotating one left hand spiral drive 12 and one right hand spiral drive 14 in a counter clockwise direction.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A transport device comprising:
at least four spiral drives, at least one of said at least four spiral drives includes at least two spiral axles, a first end plate, a second end plate and a plurality of wheels, said at least two spiral axles having a first end and a second end, said first end of said at least two spiral axles are attached to said first end plate, said plurality of wheels are rotatably retained on said at least two spiral axles, said second end of said at least two spiral axles are attached to said second end plate; and
a support base for rotatably retaining said at least four spiral drives, said support base includes four corners, a single spiral drive of said at least four spiral drives is located in each one of said four corners; and
at least one drive device for causing said at least four spiral drives to rotate.

2. The transport device of claim 1, further comprising:
a control device for regulating power supplied to said at least one drive device, said control device controlling the rotational direction of said at least one drive device.

3. The transport device of claim 1 wherein:
two of said transport devices are adapted to be retained on an object.

4. A transport device comprising:
at least four spiral drives, each one of said at least four spiral drives includes at least two spiral axles, a first end plate, a second end plate and a plurality of wheels, said at least two spiral axles having a first end and a second end, said first end of said at least two spiral axles are attached to said first end plate, said plurality of wheels are rotatably retained on said at least two spiral axles, said second end of said at least two spiral axles are attached to said second end plate, two of said at least four spiral drives include said at least two spiral axles with a clockwise twist, two of said at least four spiral drives include said at least two spiral axles with a counterclockwise twist;
a support base for rotatably retaining said at least four spiral drives, said support base includes four corners, a single spiral drive of said at least four spiral drives is located in each one of said four corners; and
at least one drive device for causing said at least four spiral drives to rotate.

5. The transport device of claim 4, further comprising:
a control device for regulating power supplied to said at least one drive device, said control device controlling the rotational direction of said at least one drive device.

6. The transport device of claim 4 wherein:
two of said transport devices are adapted to be retained on an object.

7. A transport device comprising:
a support base including four corners;
at least four spiral drives, each one of said at least four spiral drives includes at least two spiral axles, a first end plate, a second end plate and a plurality of wheels, said at least two spiral axles having a first end and a second end, said first end of said at least two spiral axles are attached to said first end plate, said plurality of wheels are rotatably retained on said at least two spiral axles, said second end of said at least two spiral axles are attached to said second end plate, two of said at least four spiral drives include said at least two spiral axles with a clockwise twist, two of said at least four spiral drives include said at least two spiral axles with a counterclockwise twist, one of said two spiral drives with said counterclockwise twist is located in one corner of said four corners, said two spiral drives with said clockwise twist is located in two adjacent corners of said four corners, said support base for rotatably retaining said at least four spiral drives, a single spiral drive of said at least four spiral drives is located in each one of said four corners; and
at least one drive device for causing said at least four spiral drives to rotate.

8. The transport device of claim 7, further comprising:
a control device for regulating power supplied to said at least one drive device, said control device controlling the rotational direction of said at least one drive device.

9. The transport device of claim 7 wherein:
two of said transport devices are adapted to be retained on an object.

\* \* \* \* \*